US012580869B2

(12) United States Patent
York et al.

(10) Patent No.: US 12,580,869 B2
(45) Date of Patent: Mar. 17, 2026

(54) SYSTEMS AND METHODS FOR NETWORK TRAFFIC TRUNKING

(71) Applicant: F5, Inc., Seattle, WA (US)

(72) Inventors: Zachary York, Reno, NV (US); Jeffrey J. Walker, Spokane, WA (US); Timothy S. Michels, Greenacres, WA (US); C Stuart Johnson, Spokane, WA (US)

(73) Assignee: F5, Inc., Seattle, WA (US)

( * ) Notice: Subject to any disclaimer, the term of this patent is extended or adjusted under 35 U.S.C. 154(b) by 187 days.

(21) Appl. No.: 17/991,103

(22) Filed: Nov. 21, 2022

(65) Prior Publication Data

US 2023/0164086 A1 May 25, 2023

Related U.S. Application Data

(60) Provisional application No. 63/282,495, filed on Nov. 23, 2021.

(51) Int. Cl.
*H04L 47/34* (2022.01)
*H04L 45/74* (2022.01)

(52) U.S. Cl.
CPC .............. *H04L 47/34* (2013.01); *H04L 45/74* (2013.01)

(58) Field of Classification Search
None
See application file for complete search history.

(56) References Cited

U.S. PATENT DOCUMENTS

| | | | | |
|---|---|---|---|---|
| 7,945,721 | B1 * | 5/2011 | Johnsen | ................ G06F 13/385 |
| | | | | 710/10 |
| 7,979,592 | B1 * | 7/2011 | Pettey | ................... G06F 13/404 |
| | | | | 709/205 |
| 8,085,794 | B1 * | 12/2011 | Niver | ...................... H04L 45/54 |
| | | | | 370/401 |
| 8,284,790 | B1 * | 10/2012 | Kommidi | ............ H04L 49/3018 |
| | | | | 370/416 |
| 9,535,870 | B2 | 1/2017 | Vucinic et al. | |
| 10,103,993 | B2 | 10/2018 | White | |

(Continued)

OTHER PUBLICATIONS

International Search Report dated Mar. 27, 2023 issued in International Application No. PCT/US22/50559.

(Continued)

*Primary Examiner* — Eunsook Choi

(74) *Attorney, Agent, or Firm* — Troutman Pepper Locke LLP

(57) ABSTRACT

Technology related to sending data items via network links in a link aggregate group is disclosed. Data items (such as network packets received via a computer network) can be analyzed to determine whether the data items qualify for a relaxed transmission ordering. If a data item does not qualify for relaxed transmission ordering, then a network link in the link aggregate group can be selected based on contents of the data item (such as by generating a signature or key based on headers of the data item and selecting a network link based on the signature or key). However, if the data item does qualify for relaxed transmission ordering, then a network link in the link aggregate group can be selected based on available capacities of the network links (such as by selecting a network link with a largest available capacity).

20 Claims, 7 Drawing Sheets

(56) References Cited

U.S. PATENT DOCUMENTS

| | | | | |
|---|---|---|---|---|
| 11,748,285 B1 * | 9/2023 | Haim | .................. | G06F 13/4282 |
| | | | | 710/305 |
| 2006/0184296 A1 * | 8/2006 | Voeller | ................. | G01B 11/275 |
| | | | | 701/31.4 |
| 2011/0106981 A1 * | 5/2011 | Watkins | .............. | G06F 13/4221 |
| | | | | 710/9 |
| 2015/0006749 A1 * | 1/2015 | Hendel | ................... | H04L 47/34 |
| | | | | 709/230 |
| 2015/0177994 A1 * | 6/2015 | Vucinic | .................. | G06F 12/08 |
| | | | | 711/103 |
| 2017/0295099 A1 | 10/2017 | Murphy | | |
| 2019/0391939 A1 | 12/2019 | Safranek et al. | | |
| 2020/0145725 A1 * | 5/2020 | Eberle | ................ | H04N 21/2387 |
| 2020/0356497 A1 * | 11/2020 | Lesartre | ............. | G06F 13/1642 |
| 2021/0152477 A1 | 5/2021 | Johnsen et al. | | |
| 2022/0085916 A1 * | 3/2022 | Debbage | ................ | H04L 47/10 |

OTHER PUBLICATIONS

Extended EP Search Report issued in EP Application No. 22899314.
3, completed on Jul. 24, 2025, 12 pp.

* cited by examiner

200

400

SYSTEMS AND METHODS FOR NETWORK TRAFFIC TRUNKING

This application claims the benefit of U.S. Provisional Patent Application Ser. No. 63/282,495, filed Nov. 23, 2021, which is hereby incorporated by reference in its entirety.

FIELD

This technology generally relates to data routing and, more specifically, to network traffic distribution.

BACKGROUND

In some computer networking scenarios, it can be advantageous to present a plurality of network links connecting a same source computing device to a same destination computing device as if they were a single network link. Such a configuration can be referred to as a "trunk" or a "link aggregate group." In some such scenarios, a computing device connected to the plurality of network links can be configured to advertise the link aggregate groups as a single network link to other computing devices in a computer network.

BRIEF SUMMARY

In an example embodiment, a system for sending network packets in a link aggregate group, the system comprises: a link aggregate group comprising a plurality of network links; a processor; and one or more computer-readable media comprising programmed instructions stored thereon, the system configured to be capable of: determining whether a network packet received via a computer network qualifies for relaxed packet ordering; if the network packet qualifies for relaxed packet ordering, selecting a network link, of the plurality of network links of the link aggregate group, based on available capacities of the plurality of network links and sending the network packet to the selected network link; and otherwise, selecting a network link, of the plurality of network links of the link aggregate group, based on contents of the network packet and sending the network packet to the selected network link.

In another example embodiment, a computer-implemented method for sending data items in a link aggregate group comprises: determining whether a data item qualifies for relaxed transmission ordering; if the data item qualifies for relaxed transmission ordering, selecting a network link, of a plurality of network links of a link aggregate group, based on available capacities of the plurality of network links and sending the data item to the selected network link; and otherwise, selecting a network link, of the plurality of network links of the link aggregate group, based on contents of the data item and sending the data item to the selected network link.

Another example embodiment comprise a non-transitory computer readable medium having stored thereon instructions comprising executable code that, when executed by one or more processors, causes the one or more processors to perform operations, the operations comprising: determining whether a network packet received via a computer network qualifies for relaxed packet ordering; if the network packet qualifies for relaxed packet ordering, selecting a network link, of a plurality of network links of a link aggregate group, based on available capacities of the plurality of network links and sending the network packet to the selected network link; and otherwise, selecting a network link, of the plurality of network links of the link aggregate group, based on contents of the network packet and sending the network packet to the selected network link.

In another example embodiment, an apparatus comprises: a processor; and one or more computer-readable media comprising programmed instructions stored thereon, the apparatus configured to be capable of executing the programmed instructions to: determine whether a network packet received via a computer network qualifies for relaxed packet ordering; if the network packet qualifies for relaxed packet ordering, select a network link, of a plurality of network links of a link aggregate group, based on available capacities of the plurality of network links and sending the network packet to the selected network link; and otherwise, select a network link, of the plurality of network links of the link aggregate group, based on contents of the network packet and sending the network packet to the selected network link.

DETAILED DESCRIPTION

Figure 1:
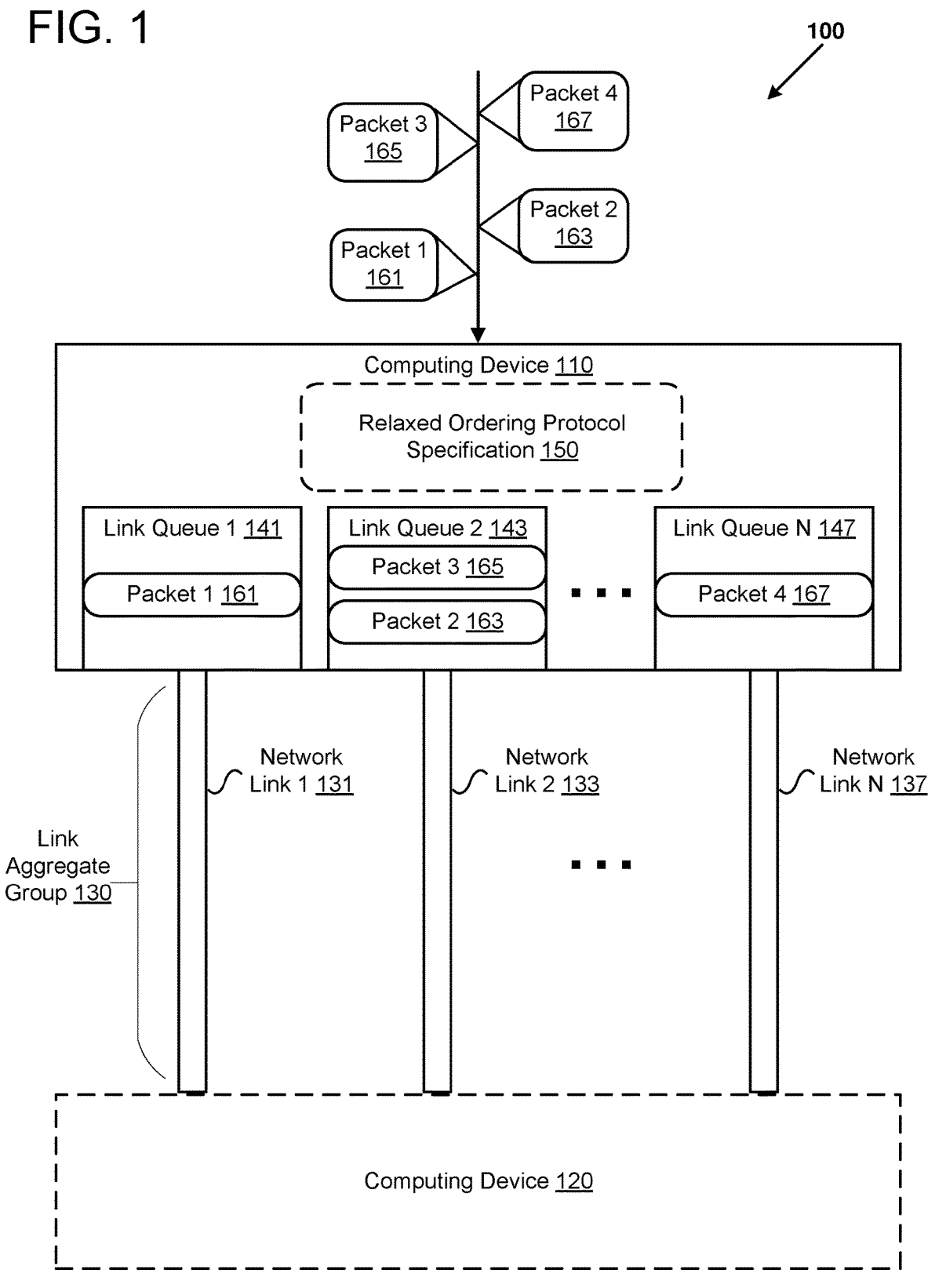
FIG. 1 is a block diagram of an example system for sending network packets between computing devices via a link aggregate group.

In some scenarios, a computing device can be configured to present a group of network links connected to a same destination as a single network link to other computing devices in a network. Such a configuration can be referred to as a "trunk" or "link aggregate group." When the computing device receives network traffic that should be routed to (or through) the destination, it can send the traffic to the destination using any of the links in the link aggregate group. Theoretically, the available capacity of the link aggregate group should be equal to (or approximately equal to) the combined capacities of all the network links in the link aggregate group. However, the actual throughput for a link aggregate group can often fall short of this theoretical capacity. One cause of such diminished throughput is the requirement of certain data items be delivered in a particular order (such as an order in which the data items are received, a packet sequence order, etc.). For example, in scenarios involving streaming protocols, it may be important for network packets to be transmitted in an order they are received. A technique for handling this in a link aggregate group is to assign data items to network links based on their contents. For example, a packet signature (such as a hash) can be generated based on contents of a packet's headers. The signature can then be assigned to a network link in the link aggregate group. The network packet, and all other network packets having the same signature, can be sent to the same network link. This can ensure, in some scenarios, that all data items in a particular communication flow will be sent to the same network link. While this can ensure correct ordering of data items, it can, in some cases, lead to traffic imbalances across the links in the link aggregate group. For example, one network link in the link aggregate group may be backlogged with data items, while other network links are underutilized; thus causing actual throughput of the link aggregate group to be diminished. Moreover, at least some of this backlog may be unnecessary since some data items assigned to a backlogged network link may not require a particular transmission order.

At least some of the techniques described herein can address these problems by determining whether data items can qualify for relaxed transmission ordering when selecting network links in a link aggregate group. For example, data items sent using a protocol that does not require data items to arrive in a particular order can be identified and distributed in a different manner across the network links in a link aggregate group than data items that must be sent in a particular order. For example, contents of a data item can be analyzed to determine whether the data item qualifies for relaxed transmission ordering. If the data item does not qualify for relaxed transmission ordering, then a network link in the link aggregate group can be selected based on contents of the data item (such as by generating a signature or key based on headers of the data item and selecting a network link based on the signature or key). However, if the data item does qualify for relaxed transmission ordering, then a network link in the link aggregate group can be selected based on available capacities of the network links (such as by selecting a network link with a largest available capacity). Thus, in at least some scenarios, throughput of a link aggregate group can be improved by avoiding unnecessary network link backlogs.

As the term is used herein, a network packet is a data structure comprising data organized according to one or more network protocols. Different protocols can be associated with different layers of the network packet. The layers within a network packet can be described using a model, such as the Open Systems Interconnection (OSI) model, that partitions a communication system into multiple layers. For example, the OSI model partitions a communication system into seven layers. The OSI model is one example of how functions of a communication system can be partitioned into abstraction layers, but other models can be used. Lower-level layers (e.g., layers 1-3) within the network stack can be used to manage voltage signaling and basic transport of the network traffic, while higher-level layers (e.g., layer 7) can be used to convey application data. Another example model is the Internet Protocol Suite, which partitions a communication system into four layers. A network packet organized according to the Internet Protocol Suite can comprise an internet layer organized according to the Internet Protocol (IP), a transport layer organized according to a transport protocol (such as the User Datagram Protocol (UDP) or the Transmission Control Protocol (TCP), and an application layer organized according to an application protocol (such as the Hypertext Transfer Protocol (HTTP).

As the term is used herein, a router comprises software and/or hardware components of a computing device configured to receive data items (such as network packets) and to transmit the received data items to one or more other components. A router can transmit data items to components of a same computing device or to one or more other computing devices. In some embodiments, the router can comprise one or more hardware and/or software components of a network traffic management apparatus.

A computing device can include one or more processor(s), one or more communication interface(s), and one or more memories. A processor, communication interface, and memory can be coupled together with an interconnect so that components of a computer apparatus can communicate with each other using the interconnect. The communication interface can be used to send and receive communications (e.g., network packets) with other computing devices, such as a client and an application server. A processor can be used to execute computer-executable instructions that are stored in memories and/or storage resources. The computer-executable instructions can be organized into software routines (also referred to as modules or components) comprising executable code to perform various computing tasks. Various organizations of routines are possible. For example, routines can be sub-divided into smaller routines and/or combined into larger routines. A memory can also include structured and/or unstructured data that are used by the software routines to perform the computing tasks.

FIG. 1 is a block diagram of an example system 100 for sending network packets (e.g., 161-167) in a link aggregate group 130 comprising a plurality of network links 131-137. The example system 100 comprises a computing device 110 and the link aggregate group 130. The computing device 110 can receive a plurality of network packets 161-167 and can send the network packets 161-167 to the plurality of network links 131-137 in the link aggregate group 130. In at least some embodiments, the computing device 110 comprises one or more processors and one or more computer-readable media comprising programmed instructions stored thereon for causing the processor to perform operations as described herein. Additionally or alternatively, the computing device 110 can comprise one or more programmable hardware components (such as a Field Programmable Gate Array (FPGA), a System On a Chip (SOC), etc.).

The computing device 110 can receive the network packets 161-167 via one or more wired and/or wireless communication channels. In at least some embodiments, the computing device 110 can receive one or more network packets via one or more computer networks, such as a wide area network, a local area network, or some combination thereof. The computing device 110 can be configured to present the plurality of network links 131-137 in the link aggregate group 130 as a single communication link having a capacity equal to (or approximately equal to) the combined capacities of the network links 131-137. For example, the computing device 110 can present the link aggregate group 130 as a single communication link to another computing device 120.

After receiving a network packet, the computing device 110 can determine whether the network packet qualifies for relaxed packet ordering. In at least some embodiments, determining whether the network packet qualifies for relaxed packet ordering can be based, at least in part, on a protocol of the network packet. For example, the computing device 110 can analyze one or more headers of the network packet to identify a protocol of the network packet and can determine whether the protocol supports out-of-order delivery of network packets. Additionally or alternatively, determining whether the network packet qualifies for relaxed packet ordering further comprises determining that the protocol of the network packet is included in a relaxed ordering protocol specification 150.

If the network packet qualifies for relaxed packet ordering, then the computing device 110 can select a network link, of the plurality of network links 131-137, of the link aggregate group 130, based on available capacities of the plurality of network links 131-137, and can send the network packet to the selected network link. For example, the computing device 110 can comprise a plurality of network link queues 141-147 that are associated with the plurality of network links 131-137 and in which are stored network packets to be sent via the respective network links. Network packets that are destined for a particular network link can be buffered in the queue associated with the network link. Available capacities of the plurality of network links 131-137 can be determined by determining a number of network packets that are currently buffered in each of the respective network link queues 141-147. In such an embodiment, a network link, of the plurality of network links 131-137 can be selected that has a largest available capacity (and/or a lowest number of network packets stored in) its associated queue, of the plurality of queues 141-147. The network packet can then be stored in the queue for the selected network link.

If the network packet does not qualify for relaxed packet ordering, the computing device 110 can select a network link, of the plurality of network links 131-137, based on contents of the network packet and can send the network packet via the selected network link. For example, in an embodiment where the computing device comprises a plurality of queues 141-147 associated with the network links 131-137, the computing device can store the network packet in a queue associated with the selected network link. Selecting the network link can comprise analyzing contents of one or more headers of the network packet. For example, a communication flow of the network packet (such as a TCP port number, source IP address, and/or sequence number, etc.) can be associated with a network link, of the plurality of network links 131-137. Network packets in the same communication flow can be stored in the queue for the same network link and can be sent via the network link associated with the communication flow in the order in which they are received by the computing device 110.

In the example scenario depicted in FIG. 1, a network packet 161 is received by the computing device 110. The computing device 110 can determine that the packet 161 qualifies for relaxed packet ordering. For example, the computing device 110 can identify a protocol of the network packet 161 based on contents of the network packet 161 and can determine that the protocol supports relaxed packet ordering based on the relaxed ordering protocol specification 150. The computing device 110 can select the network link 131 based on available capacities of the plurality of queues 141-147, and can store the network packet 161 in the queue 141 associated with the network link 131. The network packet 161 can then be sent to the network link 131.

In the example scenario depicted in FIG. 1, the router 110 then receives the network packet 163. The computing device 110 can determine that the packet 163 does not qualify for relaxed packet ordering. For example, the computing device 110 can identify a protocol of the network packet 163 based on contents of the network packet 163 and can determine that the protocol does not support relaxed packet ordering based on the relaxed ordering protocol specification 150 and/or that the protocol is not included in the relaxed ordering protocol specification 150. The computing device 110 can then select the network link 133, of the plurality of network links 131-137, based on contents of the network packet 163. For example, the computing device 110 can determine, based on contents of the network packet 163, that the network packet is part of a communication flow associated with the network link 133. The computing device can store the network packet 163 in the queue 143 associated with the network link 133. The network packet 163 can then be sent to the network link 133.

In the example scenario depicted in FIG. 1, the router 110 then receives the network packet 165. The computing device 110 can determine that the packet 165 also does not qualify for relaxed packet ordering. For example, the computing device 110 can identify a protocol of the network packet 165 based on contents of the network packet 165 and can determine that the protocol does not support relaxed packet ordering based on the relaxed ordering protocol specification 150 and/or that the protocol is not included in the relaxed ordering protocol specification 150. The computing device 110 can then select the network link 133, of the plurality of network links 131-137, based on contents of the network packet 165. For example, the computing device 110 can determine, based on contents of the network packet 165, that the network packet is part of the same communication flow as the network packet 163 that is associated with the network link 133. The computing device can then store the network packet 165 in the queue 143 associated with the network link 133. The network packet 165 can then be sent to the network link 133.

In the example scenario depicted in FIG. 1, a network packet 167 is then received by the computing device 110. The computing device 110 can determine that the packet 167 qualifies for relaxed packet ordering. For example, the computing device 110 can identify a protocol of the network packet 167 based on contents of the network packet 161 and can determine that the protocol supports relaxed packet ordering based on the relaxed ordering protocol specification 150. The computing device 110 can select the network link 137 based on available capacities of the plurality of queues 141-147, and can store the network packet 167 in the queue 147 associated with the network link 137. The network packet 161 can then be sent to the network link 131.

Thus, in at least some scenarios, the computing device 110 can distribute network packets that qualify for relaxed packet ordering across the plurality of network links 131-137 in the link aggregate group 130 based on their available capacities, while also guaranteeing that network packets that do not qualify for relaxed packet ordering are distributed to the network links 131-137 based on their contents.

Figure 2:
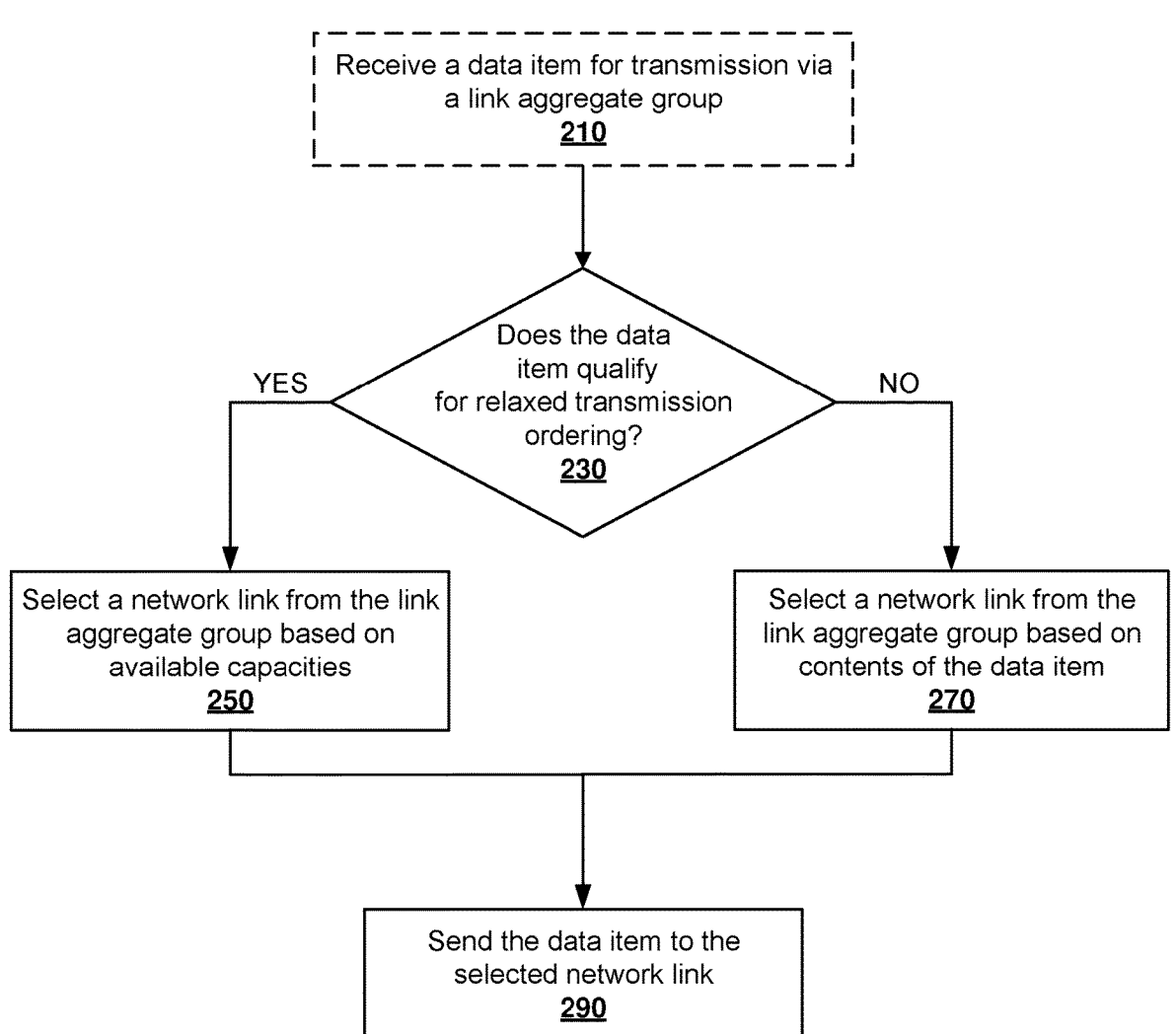
FIG. 2 is a flowchart of an example method for sending a data item via a link aggregate group.

FIG. 2 is a flowchart of an example method 200 for sending network packets via a link aggregate group. Any of the example computing devices or systems described herein can be used to perform the example method 200. As one example, the example network traffic management apparatus 310 can be used to perform all or part of the example method 200. For example, computer-executable instructions for carrying out the method 200 can be stored in computer-readable memory (e.g., the memory 330 depicted in FIG. 3) and the instructions can be executed by one or more processor(s) (e.g., the processor(s) 315 depicted in FIG. 3) to perform the method 200. As another example, the example system 100 depicted in FIG. 1 can be used to perform all or part of the example method 200.

Figure 3:
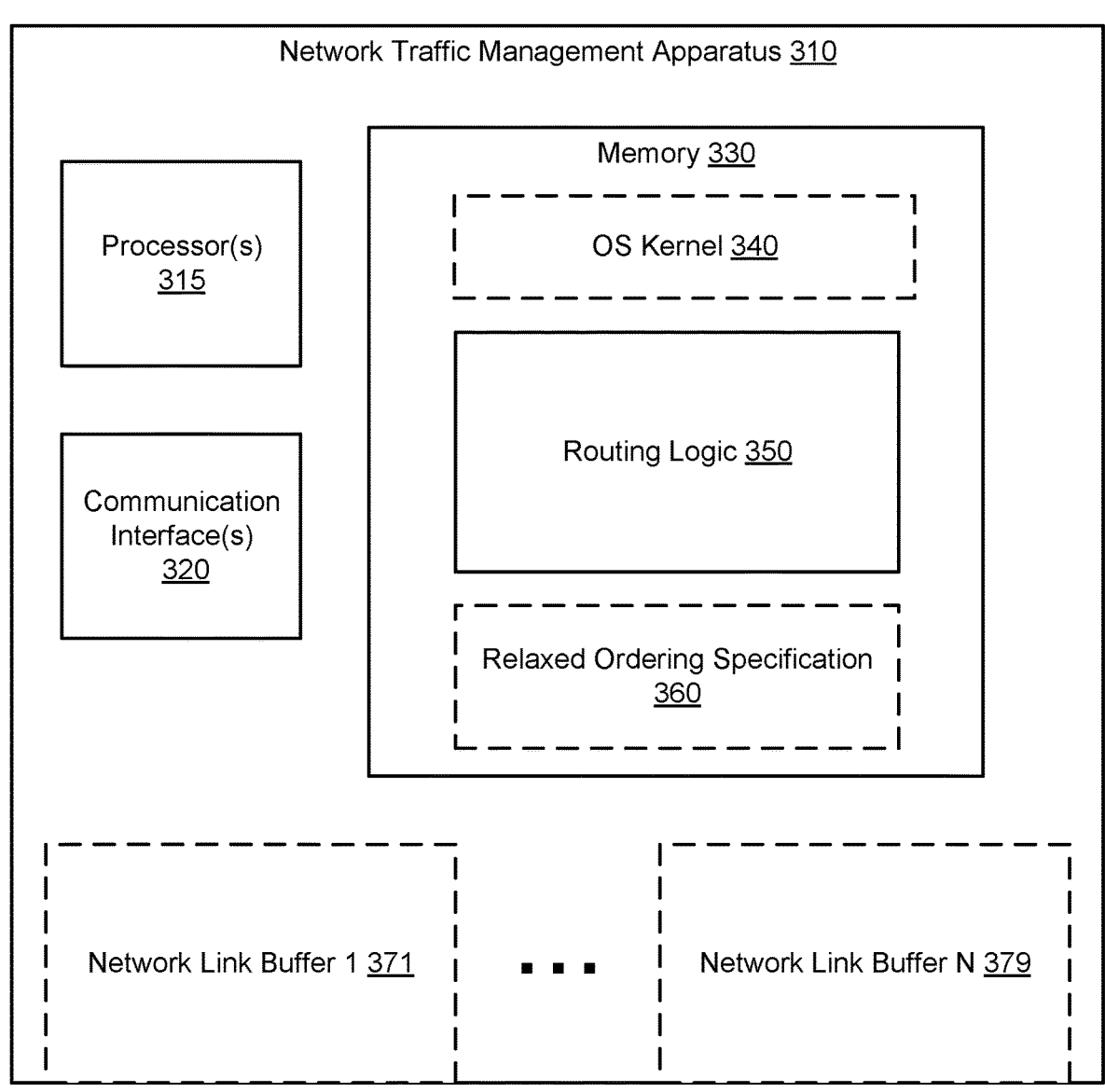
FIG. 3 is a block diagram of an example network traffic management apparatus for sending one or more data items via a link aggregate group.

FIG. 3 is a block diagram of an example network traffic management apparatus 310 for sending one or more data items via a link aggregate group (not shown). The network traffic management apparatus 310 comprises one or more processors 315, one or more communication interfaces 320, and a memory 330. The memory 330 comprises routing logic 350 comprising instructions that, when executed by one or more of the processor(s) 315, cause the network traffic management apparatus 310 to perform operations for sending data items via a network link aggregate group as described herein. Optionally, the network traffic management apparatus 310 can comprise a plurality of buffers 371-379 associated with a plurality of network links of a link aggregate group. The network traffic management apparatus 310 can be connected to a plurality of network links of a link aggregate group that are external to the network traffic management apparatus 310. Optionally, the memory 330 of the network traffic management apparatus 310 can comprise an operating system kernel 340 that can be used to manage execution of the routing logic 350 and/or mediate access by the routing logic to the communication interface(s) 320 and/or the network link buffers 371-379. The network traffic management apparatus 310 can be implemented using a computing environment as described in more detail with reference to FIG. 6.

Optionally, at 210, a data item is received for transmission via a link aggregate group. For example, a data item can be received via one or more of the communication interfaces 320 of the network traffic management apparatus 310 for transmission via a link aggregate group. The link aggregate group can comprise a plurality of network links connected to a plurality of the communication interfaces 320. Alternatively, the data item can be generated by the network traffic management apparatus 310.

At 230, it is determined whether the data item qualifies for relaxed transmission ordering. For example, the network traffic management apparatus 310 can determine whether a data item qualifies for relaxed transmission ordering. In at least some embodiments, the data item comprises a network packet. In such an embodiment, determining whether the data item qualifies for relaxed transmission ordering can be based, at least in part, on a protocol of the network packet. For example, the network traffic management apparatus 310 can analyze one or more headers of the network packet to identify a protocol of the network packet and can determine whether the protocol supports out-of-order delivery of network packets. Additionally or alternatively, determining whether the data item qualifies for relaxed transmission ordering further comprises determining that the protocol of the network packet is included in a relaxed ordering protocol specification 360 stored, at least in part, in the memory 330.

If the data item qualifies for relaxed transmission ordering, then at 250 a network link, of a plurality of network links of a link aggregate group, is selected based on available capacities of the plurality of network links. For example, the network traffic management apparatus 310 can select a network link, of the plurality of network links of the link aggregate group 130, based on available capacities of the plurality of network links. In at least some embodiments, the network traffic management apparatus 310 can comprise a plurality of buffers 371-379 that are associated with the plurality of network links. Data items can be written to the buffers 371-379 associated with the network links and the data items can be retrieved from the buffers 371-379 and sent to the associated network links via a plurality of the communication interfaces 320 to which the network links are connected. For example, data items that are destined for a particular network link can be stored in the buffer associated with the network link. Available capacities of the plurality of network links can be determined by determining a number of data items that are currently buffered in each of the respective network link buffers 371-379. In such an embodiment, a network link, of the plurality of network links can be selected that has a largest available capacity in (and/or a lowest number of data items stored in) its associated buffer, of the plurality of buffers 371-379.

If the data item does not qualify for relaxed transmission ordering, then at 270 a network link, of the plurality of network links of the link aggregate group, is selected based on contents of the data item. For example, the network transmission apparatus 310 can select a network link, of the plurality of network links based on contents of the data item and can send the data item via the selected network link. For example, in an embodiment where the computing device comprises a plurality of buffers 371-379 associated with the plurality of network links of the link aggregate group, the network traffic management apparatus 310 can store the data item in a buffer associated with the selected network link. In an embodiment where the data item comprises a network packet, selecting the network link can comprise analyzing contents of one or more headers of the network packet. For example, a communication flow of the network packet (such as a TCP port number, source IP address, and/or sequence number, etc.) can be associated with a network link, of the plurality of network links. Network packets in the same communication flow can be stored in the buffer for the same network link and can be sent via the network link associated with the communication flow in the order in which they are received by the network traffic management apparatus 310.

At 290, the data item is sent to the selected network link. For example, the network traffic management apparatus 310 can store the data item in a network buffer, of the plurality of network buffers 371-379, associated with the selected network link. The data item can be retrieved from the buffer and transmitted to the network link via one of the communication interfaces 320 connected to the selected network link.

Figure 4A:
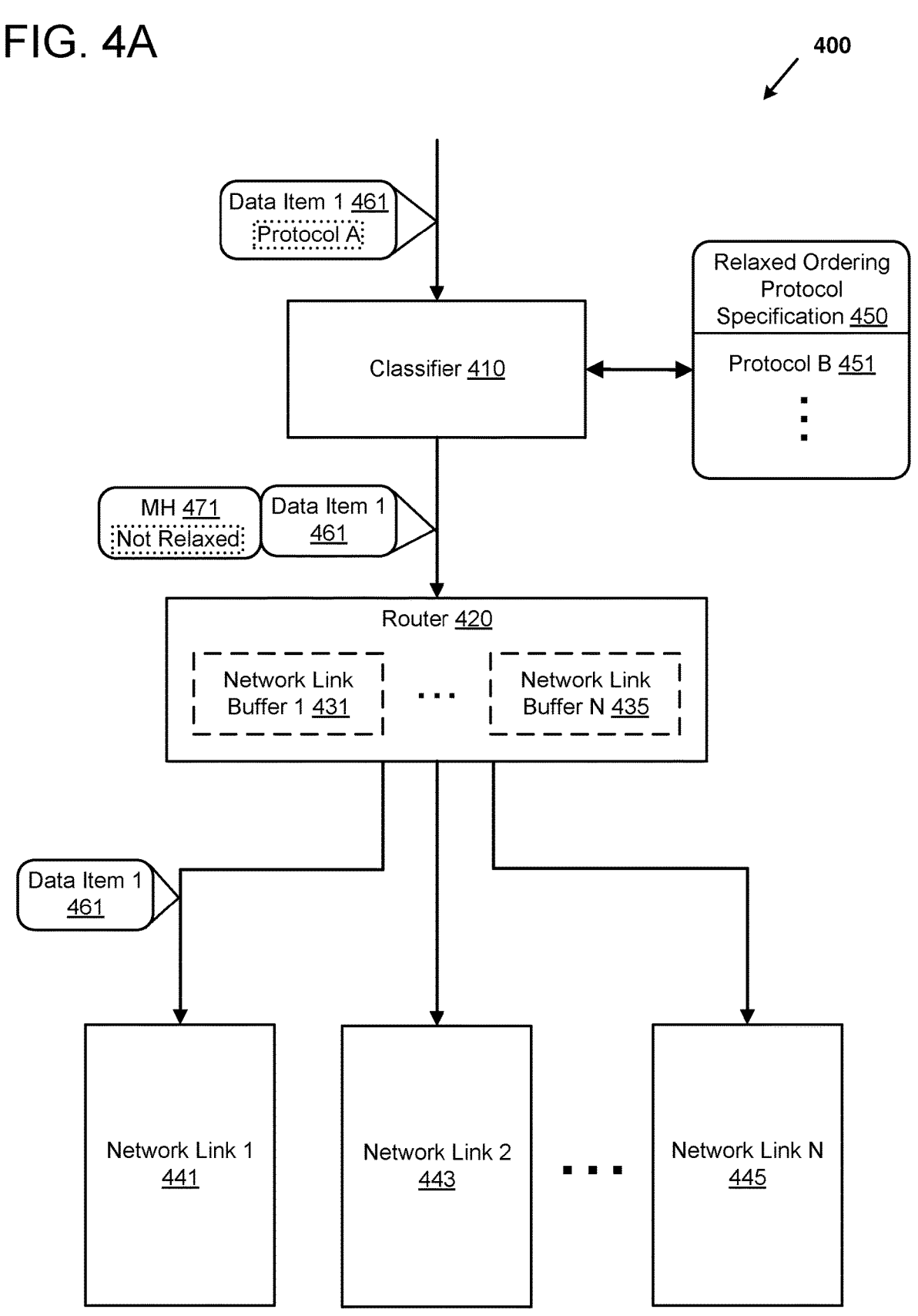
FIGS. 4A-B are block diagrams of an example system for sending a plurality of data items via a link aggregate group.
Figure 4B:
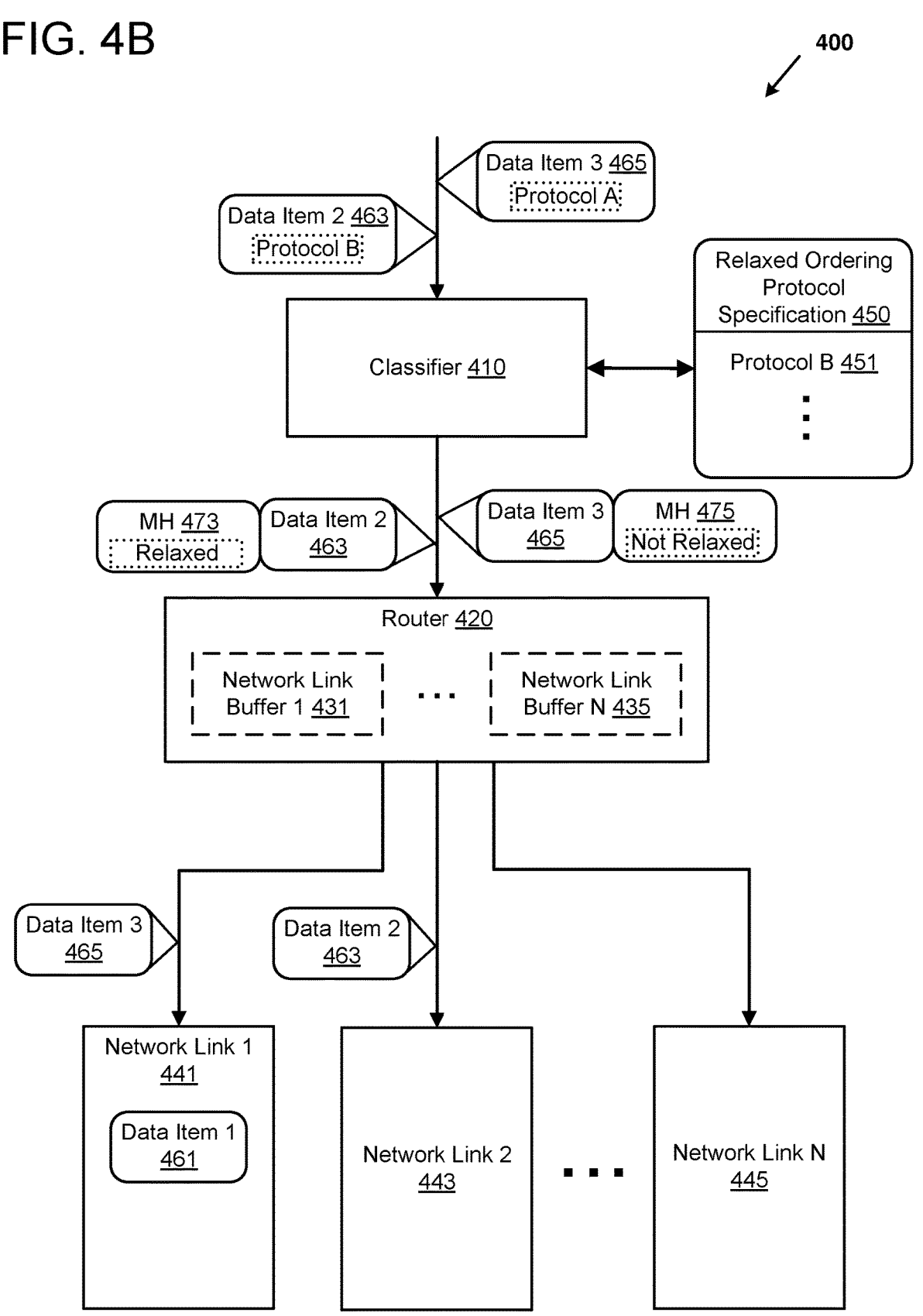

FIGS. 4A-B are block diagrams of an example system 400 for sending a plurality of data items via a link aggregate group. The example system 400 comprises a classifier 410, a router 420, a link aggregate group comprising a plurality of network links 441-445, and a relaxed ordering protocol specification 450. In some embodiments, the classifier 410, the router 420, and the relaxed ordering protocol specification 450 can be parts of a single computing device. Alternatively, the components can be distributed across multiple computing devices. For example, the classifier 410 and relaxed ordering protocol specification 450 can be included in one computing device and the router 420 can comprise an additional computing device connected to the plurality of network links 441-445 of the link aggregate group.

The classifier 410 can receive data items and determine whether the data items qualify for relaxed transmission ordering. The classifier 410 can make the determinations based, at least in part, on contents of the data items and the relaxed ordering protocol specification 450. For example, in the scenario depicted in FIG. 4A, the classifier 410 receives a data item 461 and, based on contents of the data item 461 and the relaxed ordering protocol specification 450, determines that the data item 461 does not qualify for relaxed transmission ordering. The classifier 410 can inspect contents of the data item 461 to determine a protocol of the data item 461. The classifier 410 can search the relaxed ordering protocol specification 450 to determine that the protocol of the data item 461 is not included in the relaxed ordering protocol specification 450.

The classifier 410 can associate data items with identifiers that indicate whether the data items qualify for relaxed transmission ordering. In some embodiments, the identifier comprises a metadata header that is transmitted with the data item to the selected network link. For example, the classifier can associate the data item 461 with a metadata header 471 that indicates that the data item 461 does not qualify for relaxed transmission ordering.

After determining whether a data item qualifies for relaxed transmission ordering, the classifier can transmit the data item and the associated identifier to the router 420. For example, in the scenario depicted in FIG. 4A, the classifier 410 transmits the data item 461 and the associated metadata header 471 to the router 420.

The router 420 can receive data items and associated identifiers from the classifier 410 and can send the data items to the network links 441-445. If an identifier associated with a data item indicates that the data item qualifies for relaxed transmission ordering, the router 420 can select a network link, of the plurality of network links 441-445, based on available capacities of the network links 441-445. Optionally, the router 420 can comprise a plurality of buffers 431-435 associated with the network links 441-445. In such an embodiment, determining an available capacity of a network link can comprise determining a number of data items currently stored in a buffer, of the buffers 431-435, that is associated with the network link. Otherwise, if the identifier associated with the data item indicates that the data item does not qualify for relaxed transmission ordering, the router 420 can select a network link, of the plurality of network links 441-445, based on contents of the data item.

In the scenario depicted in FIG. 4A, the router 420 receives the data item 461 and associated metadata header 471 from the classifier 410 and determines, based on the metadata header 471, that the data item 461 does not qualify for relaxed transmission ordering. The router 420 selects the network link 441 based on contents of the data item 461 and sends the data item 461 to the network link 441. For example, the router 420 can determine that the data item 461 is part of a communication flow associated with the network link 441. Optionally, sending the data item 461 to the network link 441 can comprise storing the data item 461 in a buffer 431 associated with the network link 441.

The process can be repeated as additional data items are received. For example, in the scenario depicted in FIG. 4B, another data item 463 is received by the classifier 410. The classifier determines that the data item 463 qualifies for relaxed transmission ordering based on contents of the data item 463 and the relaxed ordering protocol specification 450. For example, the classifier 410 can identify a protocol of the data item 463 and can determine that the relaxed ordering protocol specification 450 contains an entry 451 for the protocol of the data item 463. Based on the determining, the classifier 410 can associate the data item 463 with a metadata header 473 that indicates that the data item 463 qualifies for relaxed transmission ordering. The classifier 410 can then transmit the data item 463 and the associated metadata header 473 to the router 420.

The router 420 can receive the data item 463 and the metadata header 473, determine, based on the metadata header 473, that the data item 463 qualifies for relaxed transmission ordering, and select the network link 443 based on available capacities of the network links 441-445. The router 420 can then send the data item 463 to the selected network link 443.

The classifier 410 can receive another data item 465 and determine, based on the contents of the data item 465 and the relaxed ordering protocol specification 450, that the data item 465 does not qualify for relaxed transmission ordering. The classifier 410 can associate the data item 465 with a metadata header 475 that indicates that the data item 465 does not qualify for relaxed transmission ordering and transmit the data item 465 and the metadata header 475 to the router 420. The router 420 can receive the data item 465 and the associated metadata header 475, and determine, based on the metadata header 475, that the data item 465 does not qualify for relaxed transmission ordering. The router 420 can then select the network link 441 based on contents of the data item 465. For example, the router 420 can determine that the data item 465 is part of the same communication data flow as the data item 461 and can select the network link 441 based on the association between the network link 441 and the communication data flow. The router 420 can then send the data item 465 to the network link 441.

Thus, in at least some scenarios, data items that qualify for relaxed transmission ordering can be distributed among the network links 441-445 of the link aggregate group based on network link capacity, while data items that do not qualify for relaxed transmission ordering can be transmitted based on their contents.

Figure 5:
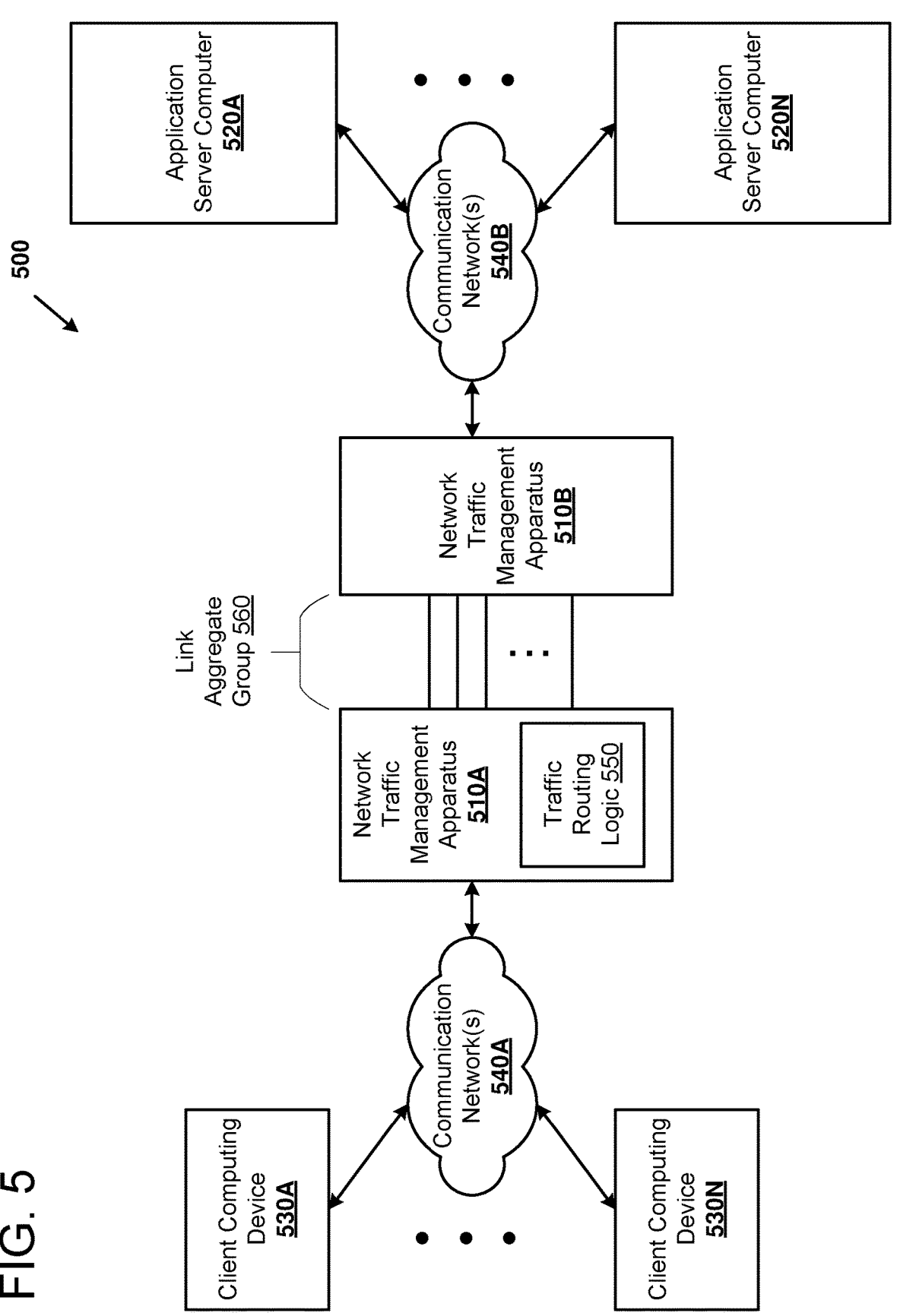
FIG. 5 is a block diagram of an example client-server architecture including a plurality of network traffic management apparatuses configured for sending network packets via a link aggregate group.

FIG. 5 illustrates an example client-server architecture 500 (also referred to as a network traffic management system) that incorporates network traffic management apparatuses 510A-B. The client-server architecture 500 includes a network traffic management apparatus 510B that is coupled to one or more server computers (such as application server computers 520A-N) and a network management apparatus 510A that is couples to one or more client devices (such as client computing devices 530A-N) via one or more communication networks (such as the communication networks 540A and 540B). The server computers 520A-N can communicate with one or more additional server computer(s) that are accessible via the communication networks 540A-B. As one example, the communication network 540A can include a public network (e.g., the Internet) and devices attached to the network 540A can be accessed using public network addresses; the communication network 540B can include a private network and devices attached to the network 540B can be accessed using private network addresses. The network traffic management apparatus 510A is connected to the network traffic management apparatus 510B by a link aggregate group 560, comprising a plurality of network links. The network traffic management apparatus 510A can be configured to present the plurality of network links in the link aggregate group 560 as a single network link to the network traffic management apparatus 510B having a capacity equal to (or approximately equal to) the combined capacities of the network links.

The communication networks 540A-B can include various wired and/or wireless communication technologies, such as a local area network (LAN), a wide area network (WAN), an intranet, the Internet, a public switched telephone network (PSTN), and so forth. The devices connected to the communication networks 540A-B can communicate with each other using various communications protocols, such as transmission control protocol with Internet protocol (TCP/IP) over Ethernet and/or other customized or industry-standard protocols. The communication protocols can be used to transmit information over the networks 540A-B using packet-based messages (e.g., Ethernet-based packet data networks) and/or other application programming interfaces (APIs). An API is a programmatic interface (e.g., a set of methods and/or protocols) for communicating among different modules. The communication networks 540A-B can include various network devices, such as switches (multilayer or single-layer), routers, repeaters, gateways, network bridges, hubs, protocol converters, bridge routers, proxy servers, firewalls, network address translators, multiplexers, network interface controllers, wireless network interface controllers, modems, line drivers, and wireless access points, for example. As illustrated, the network traffic management apparatuses 510A-B are positioned in-line between the client computing devices 530A-N and the server computers 520A-N so that the network traffic management apparatuses 510A-B can intercept all network traffic flowing between the different networks 540A and 540B. In other examples, the network traffic management apparatuses 510A-B, the server computers 520A-N, and the client devices 530A-N can be coupled together via other topologies. As one specific example, the server computers 520A-N can be integrated within the network traffic management system 500 (e.g., server computer functions can be implemented in software within one or more devices of the network traffic management apparatus 510). It should be noted that the network topology illustrated in FIG. 5 has been simplified and that multiple networks and networking devices can be utilized to interconnect the various computing systems disclosed herein. Additionally, one or more of the devices of the client-server architecture 500 in these examples can be in a same or a different communication network including one or more public, private, or cloud networks, for example.

Figure 6:
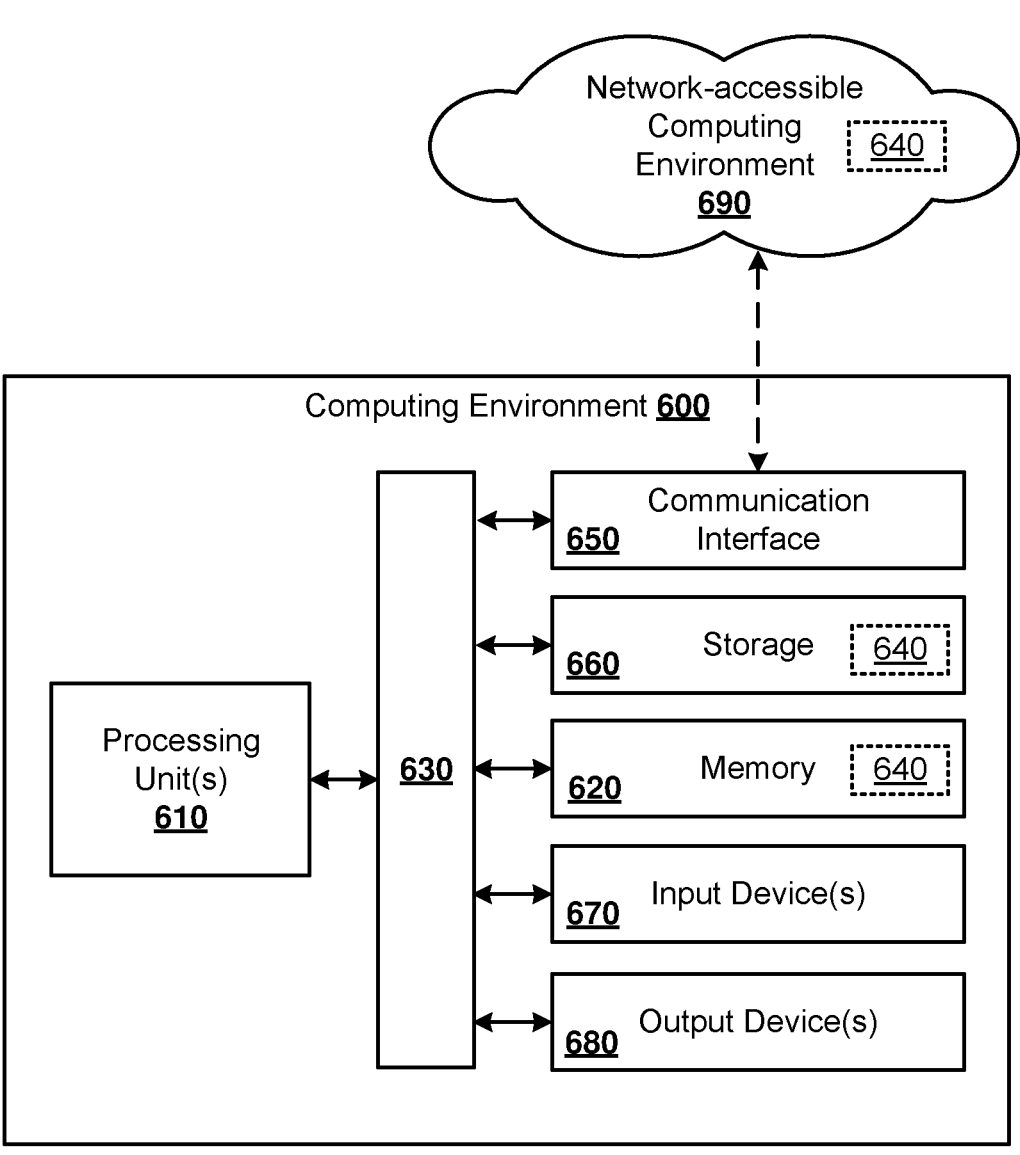
FIG. 6 is a block diagram of an example computing environment, such as can be used for a server computer.

Generally, the server computers 520A-N, the client devices 530A-N, and the network traffic management system 500 can perform various computing tasks that are implemented using a computing environment, such as the computing environment described in more detail with respect to FIG. 6. The computing environment can include computer hardware, computer software, and combinations thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations.

The client devices 530A-N can include any type of computing device that can exchange network data, such as mobile communication devices, laptop computers, desktop computers, tablet computers, virtual machines executing within a cloud-computer-based environment, and so forth. The client devices 530A-N can run interface applications, such as web browsers or standalone client applications, which may provide an interface to communicate with (e.g., make requests for, and receive content stored on) one or more of the server computers 520A-N via the communication network(s) 540A and 540B. The client devices 530A-N can further include an output device (such as a display screen or touchscreen (not illustrated)) and/or an input device (such as a keyboard (not illustrated)). Additionally, one or more of the client devices 530A-N can be configured to execute software code (e.g., JavaScript code within a web browser) in order to capture client-side data and provide the captured data to the network traffic management apparatus 510A or the server computers 520A-N.

The server computers 520A-N can include any type of computing device that can exchange network data. For example, the server computers 520A-N can exchange network data with the client devices 530A-N and with each other. As another example, the server computers 520A-N can exchange communications along communication paths specified by application logic in order to facilitate a client-server application interacting with the client devices 530A-N. Examples of the server computers 520A-N can include application servers, database servers, access control servers, web servers, and encryption servers. Accordingly, in some examples, one or more of the server computers 520A-N process login and other requests received from the client devices 530A-N via the communication network(s) 540A and 540B according to the Hypertext Transfer Protocol (HTTP) or Hypertext Transfer Protocol Secure (HTTPS) application-layer protocol. A web application may be operating on one or more of the server computers 520A-N and transmitting data (e.g., files or web pages) to the client devices 530A-N (e.g., via the network traffic management apparatus 510) in response to requests from the client devices 530A-N. The server computers 520A-N can be hardware and/or software and may represent a system with multiple servers in a pool, which may include internal or external networks.

While the server computers 520A-N are illustrated as single devices, one or more actions of each of the server computers 520A-N may be distributed across one or more distinct network computing devices that together comprise one or more of the server computers 520A-N. Moreover, the server computers 520A-N are not limited to a particular configuration. Thus, the server computers 520A-N may contain network computing devices that operate using a coordinated approach, whereby one of the network computing devices of the server computers 520A-N operate to manage or otherwise coordinate operations of the other network computing devices. Each of the server computers 520A-N can operate as a networked computing device within a cluster architecture, a computing device within a peer-to peer architecture, a virtual machine, or a resource within a cloud-based computer architecture, for example. Thus, the technology disclosed herein is not to be construed as being limited to a single environment and other configurations and architectures are also envisaged. For example, one or more of the server computers 520A-N can operate within the network traffic management apparatus 510 itself rather than as a stand-alone server device communicating with the network traffic management apparatus 510 via communication network 540B. In this example, the one or more of the server computers 520A-N operate within the memory of the network traffic management apparatus 510A and/or the network traffic management apparatus 510B.

The network traffic management apparatus 510 can include any type of computing device that can be used for managing network traffic. The network traffic management apparatus 510 can perform a number of functions, including providing network security, access control, load balancing network traffic across the server computers 520A-N, and/or accelerating network traffic associated with an application hosted by one or more of the server computers 520A-N, for example. Such functions can be performed by one or more services. These services can be incorporated into workloads that are executed by the network traffic management apparatus 510. For example, the network traffic management apparatus 510 can include a workload that is used to perform proxy and other services on behalf of the server 520A-N and to manage traffic between the clients 530A-N and the servers 520A-N. Additionally, the network traffic management apparatus 510 can include other network devices such as one or more routers or switches, for example.

The network traffic management apparatus 510A can include traffic routing logic 550 for sending data items via the link aggregate group 560 as described above with reference to FIGS. 1-4. In some embodiments, the network traffic management apparatus 510B can include traffic routing logic (not shown) for sending data items via the link aggregate group 560.

While the network traffic management apparatuses 510A-B are illustrated in this example as including single devices, respectively, a network traffic management apparatus 510 in other examples can include a plurality of devices or blades each having one or more processors (each processor with one or more processing cores) that implement one or more components of this technology. In these examples, one or more of the devices can have a dedicated communication interface or memory. Alternatively, one or more of the devices can utilize the memory, communication interface, or other hardware or software components of one or more other devices included in the network traffic management apparatus 510. Additionally, one or more of the network traffic management apparatuses 510A-B and/or the application(s) executed by one or more of the network traffic management apparatus 510A-B can be operative in a cloud-based computing environment. The application(s) can be executed within or as virtual machine(s) or virtual server(s) that can be managed in a cloud-based computing environment. For example, the application(s), and even the network traffic management apparatus 510 itself, can be located in virtual server(s) running in a cloud-based computing environment rather than being tied to one or more specific physical network computing devices. Also, the application(s) can be running in one or more virtual machines (VMs) executing on one or more of the network traffic management apparatuses 510A-B. Additionally, in one or more examples of this technology, virtual machine(s) running on one or more of the network traffic management apparatuses 510A-B can be managed or supervised by a hypervisor. Additionally, one or more of the components that together comprise one or more of the network traffic management apparatus 510A-B can be standalone devices or integrated with one or more other devices or apparatuses, such as with one or more of the server computers 520A-N, for example.

Additionally, one or more of the components depicted in the client-server architecture 500, such as the network traffic management apparatuses 510A-B, server computers 520A-N, or client computing devices 530A-N, for example, may be configured to operate as virtual instances on the same physical machine. In other words, one or more of the network traffic management apparatuses 510A-B, server computers 520A-N, or client computing devices 530A-N may operate on the same physical device rather than as separate devices communicating through communication networks 540A and 540B. Additionally, there may be more or fewer network traffic management apparatuses, client computing devices, or server computers than illustrated in FIG. 5.

FIG. 6 illustrates a block diagram of a generalized example of a suitable computing environment 600 that can be used to implement the examples, techniques, and technologies described herein. For example, the computing environment 600 can be used to implement a computing device (such as a network traffic management apparatus) that performs techniques for sending data items via a network link aggregate group as described herein.

The computing environment 600 includes at least one processing unit 610 and computer-readable memory 620, which are coupled together by an interconnect 630. The processing unit 610 executes computer-executable instructions. The processing unit 610 can include a general-purpose processor, a special-purpose processor, and combinations thereof. For example, the processing unit 610 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 620 stores software 640 implementing one or more innovations described herein, in the form of computer-executable instructions suitable for execution by the processing unit 610. Specifically, the memory 620 can be used to store computer-executable instructions, data structures, input data, output data, and other information. The memory 620 can include volatile memory (e.g., registers, cache, random-access memory (RAM)), non-volatile memory (e.g., read-only memory (ROM), electrically erasable programmable ROM (EEPROM), and flash memory), and/or combinations thereof. The memory 620 can include operating system software (not illustrated). Operating system software can provide an operating environment for other software executing in the computing environment 600 and can coordinate activities of the components of the computing environment 600.

The interconnect 630 is used to connect different components of the computing environment 600 together so that the processing unit 610 can communicate with the different components and/or so that the different components can communicate with each other. For example, the interconnect 630 can include a bus, controller, and/or a network. As one example, the interconnect 630 can include a host bridge (also referred to as a northbridge) for connecting the processing unit 610 to relatively high-speed components (such as the memory 620) and an input/output bridge (also referred to as a southbridge) for connecting to relatively lower-speed components (such as a communications interface 650) within the computing environment 600. In some examples, one or more components of the computing environment 600 can be integrated within or connected directly to the processing unit 610.

The computing environment 600 can include a communication interface 650 for communicating with another computing entity using a communication medium (e.g., a physical layer). The communication interface 650 can implement all or a portion of a network protocol stack. The network protocol stack defines communication formats and rules for communicating between different devices connected to a network. For example, the network protocol stack can define modular layers for communication using the Open Systems Interconnection (OSI) model or another model (such as the Internet Protocol Suite). The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 650 can include electronic and/or optical circuitry to receive and transmit communications signals that are encoded (e.g., according to a physical layer specification of the network stack) using an electrical, optical, radio frequency (RF), or another carrier signal. Accordingly, the communication interface 650 can be used to communicate over wired connections (e.g., twisted-wire pair, coaxial cable, and fiber optic connections) and/or wireless technologies (e.g., Bluetooth, Wi-Fi (IEEE 802.11), and cellular).

As a specific example with reference to FIG. 5, a communication interface of the network traffic management apparatus 510 operatively couples to and communicates with the communication networks 540A and 540B so that the network traffic management apparatus 510 is coupled to and can communicate with the server computers 520A-N and the client computing devices 530A-N. The communication interface of the network traffic management apparatus 510 can also operatively couple to the plurality of network links in the link aggregate group 560.

The computing environment 600 can include storage 660 that is used to store instructions for the software 640, data structures, and data, which can be used to implement the technologies described herein. The storage 660 can include electronic circuitry for reading and/or writing to removable or non-removable storage media using magnetic, optical, or other reading and writing system that is coupled to the processor. The storage 660 can include read-only storage media and/or readable and writeable storage media, such as magnetic disks, solid state drives, magnetic tapes or cassettes, CD-ROMs, CD-RWs, DVDs, or any other medium which can be used to store information and that can be accessed within the computing environment 600.

The computing environment 600 can include input device(s) 670. For example, the input device(s) 670 can provide an input interface to a user of the computing environment 600 and/or to receive inputs from a physical environment. The input device(s) 670 can include a tactile input device (e.g., a keyboard, a mouse, or a touchscreen), a microphone, a camera, a sensor, or another device that provides input to the computing environment 600.

The computing environment 600 can include output device(s) 680. For example, the output device(s) 680 can provide an output interface to a user of the computing environment 600 and/or to generate an output observable in a physical environment. The output device(s) 680 can include a light-emitting diode, a display, a printer, a speaker, a CD-writer, or another device that provides output from the computing environment 600. In some examples, the input device(s) 670 and the output device(s) 680 can be used together to provide a user interface to a user of the computing environment 600.

The computing environment 600 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 610 and the network-accessible computing environment 690 that is linked through a communications network. In a distributed computing environment, program modules 640 (including executable instructions for performing operations as described herein) can be located in both local and remote memory storage devices.

The term computer-readable media includes non-transient media for data storage, such as memory 620 and storage 660, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed embodiments can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together and does not exclude the presence of intermediate elements between the coupled items. The term "and/or" means any one item or combination of items in the phrase.

The recited order of processing elements or sequences, or the use of numbers, letters, or other designations therefore is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, assembly language, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

What is claimed is:

1. A system for sending network packets in a link aggregate group, the system comprising:
   the link aggregate group comprising a plurality of network links, the plurality of network links connecting a first computing device to a second computing device;
   a processor; and
   one or more computer-readable media comprising programmed instructions stored thereon, the system configured to be capable of:
      determining whether a network packet received via a computer network qualifies for relaxed packet ordering;
      if the network packet qualifies for relaxed packet ordering, selecting a network link with a largest available capacity from the plurality of network links of the link aggregate group, and sending the network packet to the selected network link; and
      otherwise, selecting a network link from the plurality of network links of the link aggregate group, based on contents of the network packet and sending the network packet to the selected network link.

2. The system of claim 1, wherein the determining whether the network packet qualifies for relaxed packet ordering is based on a protocol of the network packet.

3. The system of claim 2, wherein the determining whether the network packet qualifies for relaxed packet ordering further comprises determining that the protocol of the network packet is included in a relaxed ordering protocol specification.

4. The system of claim 1, wherein the system is further configured to be capable of:
   associating the network packet with an identifier that indicates whether the network packet qualifies for relaxed packet ordering.

5. The system of claim 4, wherein:
   the identifier comprises a metadata header; and
   the system is further configured to be capable of sending the metadata header with the network packet.

6. A computer-implemented method for sending data items in a link aggregate group, the method comprising:
   determining whether a data item qualifies for relaxed transmission ordering;
   if the data item qualifies for relaxed transmission ordering, selecting a network link with a largest available capacity from a plurality of network links of the link aggregate group, and sending the data item to the selected network link, the plurality of network links connecting a first computing device to a second computing device; and
   otherwise, selecting a network link from the plurality of network links of the link aggregate group, based on contents of the data item and sending the data item to the selected network link.

7. The computer-implemented method of claim 6, wherein:
   the data item comprises a network packet; and
   the determining whether the data item qualifies for relaxed transmission ordering is based on a protocol of the network packet.

8. The computer-implemented method of claim 7, wherein the determining whether the data item qualifies for relaxed transmission ordering further comprises determining that the protocol of the network packet is included in a relaxed ordering protocol specification.

9. The computer-implemented method of claim 6, further comprising:
   associating the data item with an identifier that indicates whether the data item qualifies for relaxed transmission ordering.

10. The computer-implemented method of claim 9, wherein:
    the identifier comprises a metadata header; and
    the method further comprises transmitting the metadata header with the data item.

11. A non-transitory computer readable medium having stored thereon instructions comprising executable code that, when executed by one or more processors, causes the one or more processors to perform operations, the operations comprising:
    determining whether a network packet received via a computer network qualifies for relaxed packet ordering;
    if the network packet qualifies for relaxed packet ordering, selecting a network link with a largest available capacity from a plurality of network links of a link aggregate group, and sending the network packet to the selected network link, the plurality of network links connecting a first computing device to a second computing device; and
    otherwise, selecting a network link from the plurality of network links of the link aggregate group, based on contents of the network packet and sending the network packet to the selected network link.

12. The non-transitory computer readable medium of claim 11, wherein the determining whether the network packet qualifies for relaxed packet ordering is based on a protocol of the network packet.

13. The non-transitory computer readable medium of claim 12, wherein the determining whether the network packet qualifies for relaxed packet ordering further comprises determining that the protocol of the network packet is included in a relaxed ordering protocol specification.

14. The non-transitory computer readable medium of claim 11, wherein the operations further comprise:

associating the network packet with an identifier that indicates whether the network packet qualifies for relaxed packet ordering.

15. The non-transitory computer readable medium of claim 14, wherein:

the identifier comprises a metadata header; and the operations further comprise sending the metadata header with the network packet.

16. An apparatus, comprising:

a processor; and one or more computer-readable media comprising programmed instructions stored thereon, the apparatus configured to be capable of executing the programmed instructions to:

determine whether a network packet received via a computer network qualifies for relaxed packet ordering;

if the network packet qualifies for relaxed packet ordering, select a network link with a largest available capacity from a plurality of network links of a link aggregate group, and sending the network packet to the selected network link, the plurality of network links connecting a first computing device to a second computing device; and otherwise, select a network link from the plurality of network links of the link aggregate group, based on contents of the network packet and sending the network packet to the selected network link.

17. The apparatus of claim 16, wherein the determining whether the network packet qualifies for relaxed packet ordering is based on a protocol of the network packet.

18. The apparatus of claim 17, wherein the determining whether the network packet qualifies for relaxed packet ordering further comprises determining that the protocol of the network packet is included in a relaxed ordering protocol specification.

19. The apparatus of claim 16, wherein the apparatus is further configured to be capable of executing the programmed instructions to:

associate the network packet with an identifier that indicates whether the network packet qualifies for relaxed packet ordering.

20. The apparatus of claim 19, wherein:

the identifier comprises a metadata header; and the apparatus is further configured to be capable of executing the programmed instructions to send the metadata header with the network packet.

* * * * *